Oct. 26, 1937.   G. H. HUFFERD   2,096,966
JOINT
Filed Aug. 30, 1934
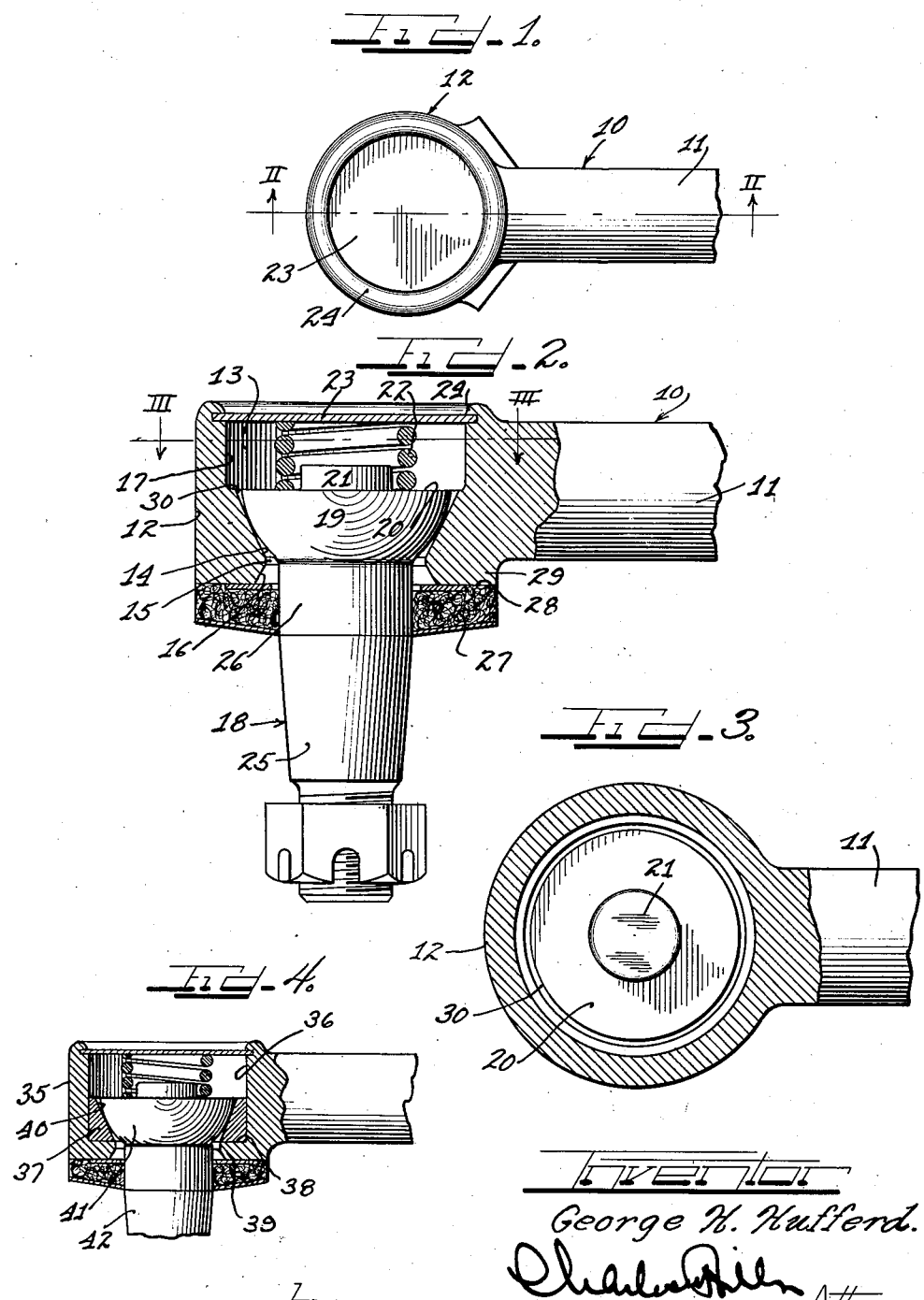
Inventor
George H. Hufferd.
by Charles Hill Atty=

Patented Oct. 26, 1937

2,096,966

UNITED STATES PATENT OFFICE 2,096,966

JOINT

George H. Hufferd, Detroit, Mich., assignor to Thompson Products, Incorporated, Cleveland, Ohio, a corporation of Ohio Application August 30, 1934, Serial No. 742,046

2 Claims. (Cl. 287—90)

This invention relates to a joint providing limited universality of movement and particularly adapted for use in tie rod and drag link connections for the steering mechanism of automotive vehicles.

It is an important object of this invention to provide an improved joint of simple, rugged construction that can be very economically manufactured.

It is a further important object of this invention to provide a joint for use with drag links and tie rods in the steering mechanism of automotive vehicles, particularly those in which the front wheels of the vehicle are independently mounted or "sprung" and consequently have a high degree of non-uniform movement, requiring considerable freedom in the joint connections.

It is a further important object of this invention to provide a joint which is substantially trouble-proof, being automatically self-adjusting to compensate for wear of the engaging parts, and in which the parts are so shaped and assembled that lost motion or rattling is effectively prevented.

Other and further important objects of this invention will be apparent from the disclosures in the specification and the accompanying drawing.

This invention (in a preferred form) is illustrated in the drawing and hereinafter more fully described.

On the drawing:

Figure 1 is a top plan elevational view of a drag link end embodying the joint of this invention.

Figure 2 is an enlarged sectional view taken substantially on line II—II of Fig. 1 with parts in elevation.

Figure 3 is a sectional view taken substantially on the line III—III of Fig. 2, with parts omitted.

Figure 4 is a sectional view of a modified joint construction with parts in elevation.

As shown on the drawing:

The invention as here illustrated and described is embodied in a drag link or tie rod end joint but it will be understood that the invention has other fields of usefulness where joints having a limited universality of movement are required. Since the general construction of drag links and tie rods is well known, the joint of this invention is described without particular reference to the drag link or tie rod assembly of which the joint may form a part.

In Figs. 1 to 3 inclusive the reference numeral 10 indicates a drag link or tie rod end comprising a shank 11 for connection in the usual way to a tie rod or drag link body portion, and a socket member 12 integrally formed therewith. The end member 10 may be suitably formed from a rolled metal bar by a series of upsetting and/or forging operations.

In its finished form, the end socket member 12 is provided with a bore 13 extending completely therethrough at right angles to the axis of the shank 11. Said bore 13 is defined by a series of wall portions, including an intermediate conical shaped portion 14, from the restricted end 15 of which extends an outwardly flared wall portion 16. A cylindrical wall portion 17 of slightly larger diameter than the larger end of the conical wall portion 15 forms a continuation of the bore from the larger end of said conical wall portion 15.

A stud 18 is associated with said end member 10 to form a connection with another element of the steering mechanism assembly. Said stud 18 is provided with a segmental spherical head 19 that is positioned within the socket member 12 with its spherical surface in bearing contact with the conical wall surface 14. Said head 19 is provided with a flat base 20 lying in a plane normal to the axis of the stud. The portion of a sphere constituted by the head 19, as shown, is less than half of a whole sphere, but this is not essential.

A cylindrical boss 21 projects centrally from the flat base 20 of said head 19 and serves to center a coiled spring 22 held under compression between said flat base 20 and a closure member 23. Said closure member 23 comprises a disk or plate suitably secured in the end of the cylindrical wall portion 17, as by spinning over a portion 24 of the metal of said socket member 12.

The shank 25 of said stud 18 includes a cylindrical portion 26 that extends freely through the restricted portion 15 of said bore 13 to provide for freedom of angular movement of the stud 18 with respect to the socket member 12. A washer 27 of conventional construction serves to close the opening around the cylindrical portion 26 of the stud to prevent loss of grease or lubricant and also to prevent the ingress of dirt and moisture into the joint. Said washer 27 rests against the face 28 of a boss 29 formed on said socket member 12. When the joint is assembled with other parts of the steering mechanism, the washer 27 is spring pressed against the surface 28.

In operation, the joint just described provides for relative rotary movement between the stud 18 and the end member 10 and for a limited degree of angular movement between these members. At all times, the spring 22 resiliently urges the head 19 into bearing engagement between its spherical surface and the conical surface 14 of the socket member. Within the range of relative movement of the parts, these bearing surfaces are therefore initially in line contact.

This type of bearing engagement has heretofore been thought undesirable because it was believed that line contact would cause excessive wearing of the bearing surfaces. This, however, has not proved to be the case in joints embodying the present invention. Even after prolonged operation, the parts upon inspection have shown very little wear and such wear as has been exhibited represents merely the tendency of the segmental spherical head to seat itself in the conical wall surface. This tendency gives rise to no excessive play or rattle in the joint owing to the action of the spring in constantly urging the bearing surfaces into closer contact with each other.

In fact, it has been found desirable to form the stud with a case hardened or special alloy steel head so that the head will gradually form its own seat in the softer metal, usually mild steel, of the socket member. The seat so formed is truer than can be readily made by machining the parts during manufacture.

The amount of angular movement between the stud 18 and the socket member 12 is ordinarily a matter of only a few degrees. This angular movement is permitted both by the clearance between the cylindrical portion 26 of the shank 25 and the restricted neck 15 of the bore, and by the clearance 30 between the peripheral edge of the head 19 and the conical wall 14.

Instead of the surface 14 being truly frusto-conical, it is obvious that it may be slightly curved in the plane of the axis of the bore. It may, for instance, be segmental spherical or ellipsoidal provided its radius of curvature is greater than that of the segmental spherical head 19. In other words, the non-conforming surfaces of the socket wall and ball head should have circular line contact for relative rotary movement and should diverge in an axial direction from said line of contact.

It will be appreciated that a joint such as described may be very economically manufactured, since it does not include any separately coined ball seats, wedging members or the like. The end socket is suitably formed from rolled metal stock by an upsetting operation to give the boss 29 and the wall portion 24. The bore of the socket member is roughly forged to shape and then machined to give the desired shape of wall surfaces as described.

Fig. 4 illustrates a modified joint construction, similar in general to that previously described except that the socket member 35 is provided with a cylindrical bore 36 in which is positioned a separately formed annular seating element 37. Said seating element 37 is preferably formed of hard, wear resisting material, such as case hardened steel, phosphor bronze or the like. The ring 37 is force fitted into the bore 36 to bear against the shoulder 38 formed by the inturned flange 39.

Said seating element 37 is provided with an internal frusto-conical face 40 for bearing contact with the segmental spherical surface 41 of the stud 42. The other elements of the joint assembly are identical with those already described.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A tie rod joint comprising a housing having a laterally extending shank portion adapted to be connected with the end of a tie rod and a socket portion having an inner bearing wall convergent axially along a straight line and circular in transverse section, a headed member having a segmental spherical head within said socket in contact with said wall intermediate the ends of said wall and means constantly urging said head in the direction of the convergence of said wall into bearing engagement with said wall, said head being of relatively harder material than said socket wall whereby upon continued operation said head forms its own seat in said wall.

2. A tie rod joint comprising a housing having a laterally extending shank portion adapted to be connected with the end of a tie rod and a socket portion having a conical shaped inner wall portion formed of mild steel, a headed member extending into said socket and having a segmental spherical head of hard steel in bearing contact with said conical shaped wall portion intermediate the ends of the wall portion, and means constantly urging said hard steel head into bearing engagement with said mild steel wall portion whereby said head gradually seats itself in true bearing fit in the mild steel conical wall portion.

GEORGE H. HUFFERD.